(12) United States Patent
Hall et al.

(10) Patent No.: US 6,239,353 B1
(45) Date of Patent: May 29, 2001

(54) SOLAR TRACKER

(76) Inventors: Christopher M. Hall, 509 Alameda de las Pulgas, Redwood City, CA (US) 94062; Frank Cava, 1089 Houston Cir., Folsom, CA (US) 95630

( * ) Notice: Subject to any disclaimer, the term of this patent is extended or adjusted under 35 U.S.C. 154(b) by 0 days.

(21) Appl. No.: 09/418,539

(22) Filed: Oct. 14, 1999

Related U.S. Application Data

(60) Provisional application No. 60/104,214, filed on Oct. 14, 1998.

(51) Int. Cl.[7] .............................. H01L 31/042; G01J 1/20
(52) U.S. Cl. ..................... 136/246; 136/291; 126/600; 126/605; 126/606; 250/203.4
(58) Field of Search ..................................... 136/246, 291; 126/600, 605, 606; 250/203.4

(56) References Cited

U.S. PATENT DOCUMENTS

| | | | | |
|---|---|---|---|---|
| 2,913,583 | * | 11/1959 | Regnier et al. | 136/246 |
| 4,129,360 | * | 12/1978 | Deflandre et al. | 136/246 |
| 4,172,739 | * | 10/1979 | Tassen | 136/246 |
| 4,328,417 | * | 5/1982 | Himes | 250/203.4 |
| 4,649,899 | * | 3/1987 | Moore | 126/578 |

* cited by examiner

Primary Examiner—Alan Diamond
(74) Attorney, Agent, or Firm—Thomas M. Freiburger

(57) ABSTRACT

A solar tracker operates on a single axis, but partially simulates a dual-axis tracker by adjusting tilt angle as the tracker rotates. The tracker is disclosed in particular embodiments which fit efficiently within a hemispherical transparent dome.

5 Claims, 3 Drawing Sheets

US 6,239,353 B1

SOLAR TRACKER

REFERENCE TO PROVISIONAL APPLICATION

This application claims the benefit of Provisional Application Ser. No. 60/104,214, filed Oct. 14, 1998

BACKGROUND AND SUMMARY OF THE INVENTION

This invention concerns solar trackers, and particularly the invention relates to several embodiments of efficient single-axis tracking systems which partially emulate multiple-axis trackers.

Solar panels, i.e. arrays of photovoltaic cells arranged in panels, are in increasing use today. The use of such photovoltaic cells is expected to accelerate as the cost of the cells decreases.

Various forms of solar trackers are also well known, for use with arrays or panels of photovoltaic cells. However, the most efficient trackers, for absorbing maximum sunlight in a given day, have been multiple-axis trackers, which rotate about more than one axis so as to follow both the azimuth variation (progression of the sun's bearing angle, i.e. east to south to west), and the sun's change in elevation angle from the horizon.

A simplified solar tracker apparatus is disclosed pursuant to this invention, in several embodiments. In each embodiment the basic rotation of the tracker is about a single axis, but the mechanism of the tracker partially emulates a two-axis tracking mechanism by making additional adjustment to more accurately track the sun, as the apparatus rotates about a single axis.

DESCRIPTION OF PREFERRED EMBODIMENTS

FIGS. 1–6 show a single, vertical axis solar tracker which accommodates rectangular PV panels in a semi-circular array. The various figures schematically indicate a mounting for solar panels, the tracking rotation axis and associated hardware.

Figure 1:
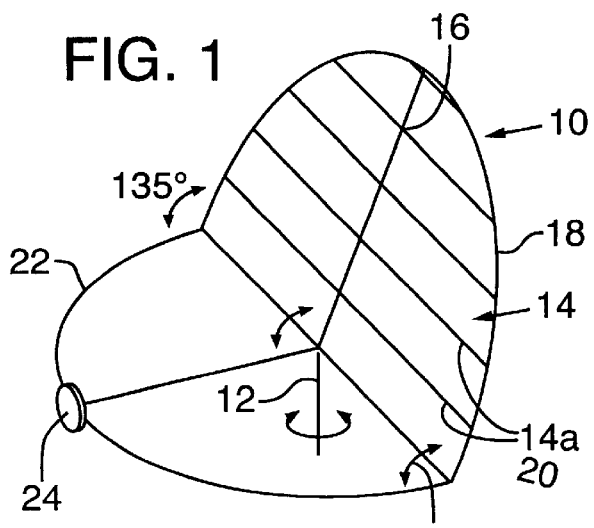
FIG. 1 is a schematic perspective view showing one embodiment of a single-axis solar tracker for a photovoltaic (PV) array.

In FIG. 1 a semi-circular PV array 10 can rotate about a vertical axis 12 for daily solar tracking. Conventional, rectangular PV panels (not shown in detail in FIG. 1) are attached in a semi-circular array to a trellis type mounting 14, which is comprised of multiple, horizontal rods 14a with a backbone rod 16 and a semi-circular perimeter 18. In this embodiment, the solar array is tilted at a fixed angle of preferably 45° from the horizontal (or equivalently, 135° from the opposite horizon). The 135° angle is shown at 20.

The apparatus 10 also includes a frame 22 which is rigidly secured to the trellis 14 and which carries counterweights 24, which balance the weight of the inclined PV panels and trellis 14.

Figure 6:
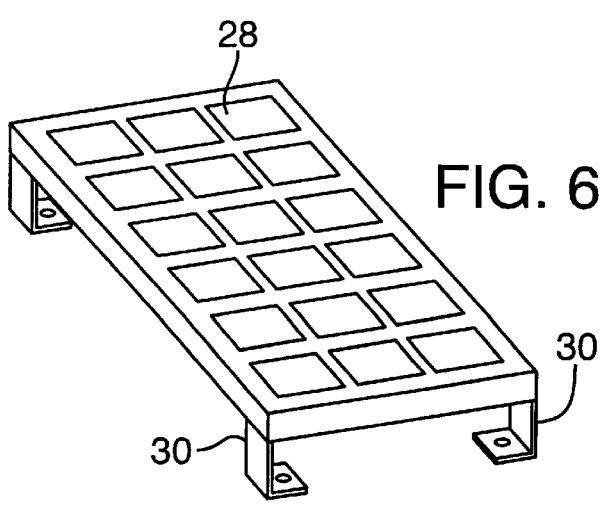
FIG. 6 is a schematic perspective view showing mounting features of an individual solar panel with multiple PV cells.

In FIG. 6, a typical rectangular PV panel 28 is indicated. The panel has feet 30, each of which has a bolt hole for securing to a mounting structure.

Figure 4:
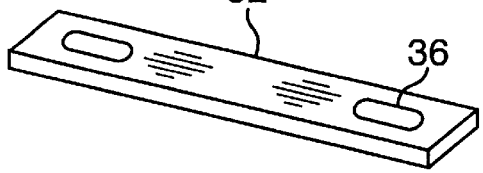
Figure 2:
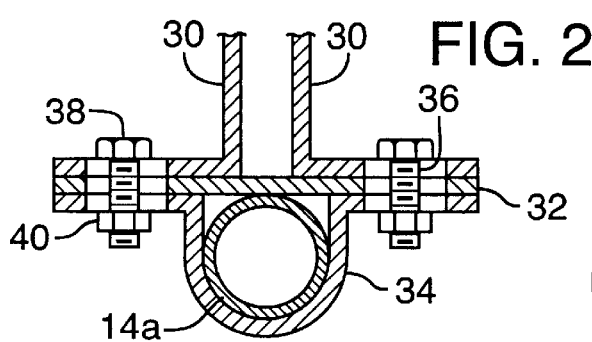
FIG. 2 is a schematic detail view partially in section, showing a preferred retention scheme for the panel and mechanism shown in FIG. 1.
Figure 5:
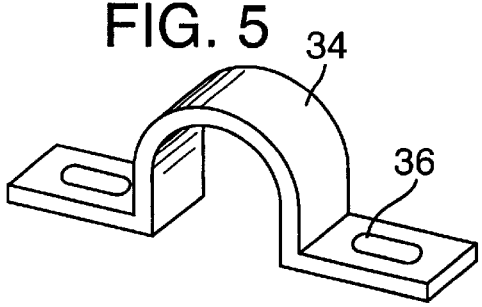

FIGS. 4 and 5 show flat plate and "C" shaped clamps 32 and 34, each with slots 36. These are used for formatting (positioning and securing) the solar panels 28 on the trellis device 14. A cross section of this assembly is shown in FIG. 2. In that figure, two panels have been placed side by side, the panels not being fully shown but the L-shaped feet 30 of each panel being shown, back to back. Below the feet 30 is a single plate 32, below which is a trellis rod 14a, from the trellis 14 in FIG. 1, and a "C" clamp 34. Bolts 38 and nuts 40 retained this assembly together, preferably including a washer (not shown). This assembly retains the solar panel 28 securely to the trellis 14.

Figure 3:
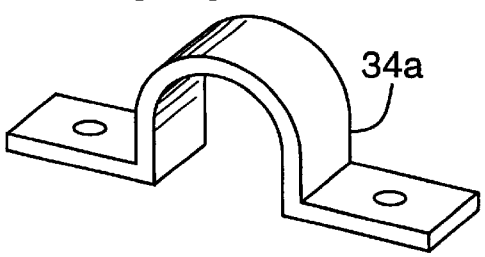
FIGS. 3, 4 and 5 show clamp configurations for use with the retention arrangement indicated in FIG. 2.

FIG. 3 shows an alternative form of "C" clamp 34a, with simple bores rather than slotted holes. The slotted holes are preferred for allowing some latitude in positioning of the solar panels into the entire assembly.

Figure 7A:
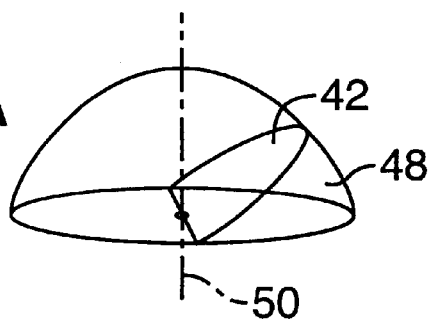
FIGS. 7A, 7B and 7C show various size panels which fit in a hemisphere dome.
Figure 7B:
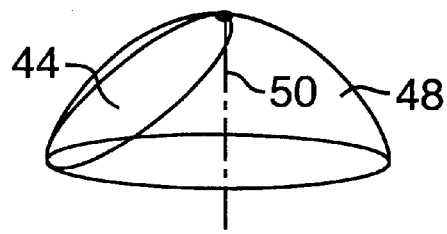
Figure 7C:
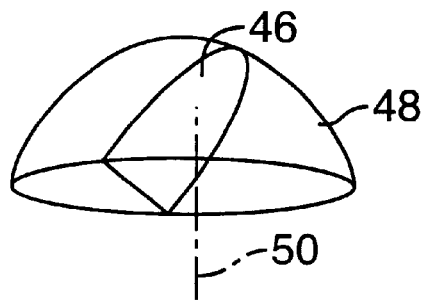

In FIGS. 7A–7C, different solar panels 42, 44 and 46 are shown inside a hemispherical dome 48. FIG. 7A shows a half semi-circle array, for rotation about a vertical axis 50. Thus, FIG. 7A is consistent with the arrangement shown in FIG. 1.

Variations are shown in FIGS. 7B and 7C. In FIG. 7B an array comprising a complete circle 44 rotates about the point where the vertical axis 50 intersects the top of the dome 48. The circle of the array 44 has the same area as the half circle shown in FIG. 7A (and in FIG. 1). This is shown in the following calculations where $r_s$ is the radius of the hemisphere and thus also of the half circle in FIG. 7A, and $r_c$ is the radius of the circle 44;

$$A = \tfrac{1}{2}\pi r_s^2$$

(for area of half circle in 7A)

$$r_c = r_s \times \sqrt{2}/2$$

$$A(\text{circle}) = \pi r_s^2/2$$

Figure 8:
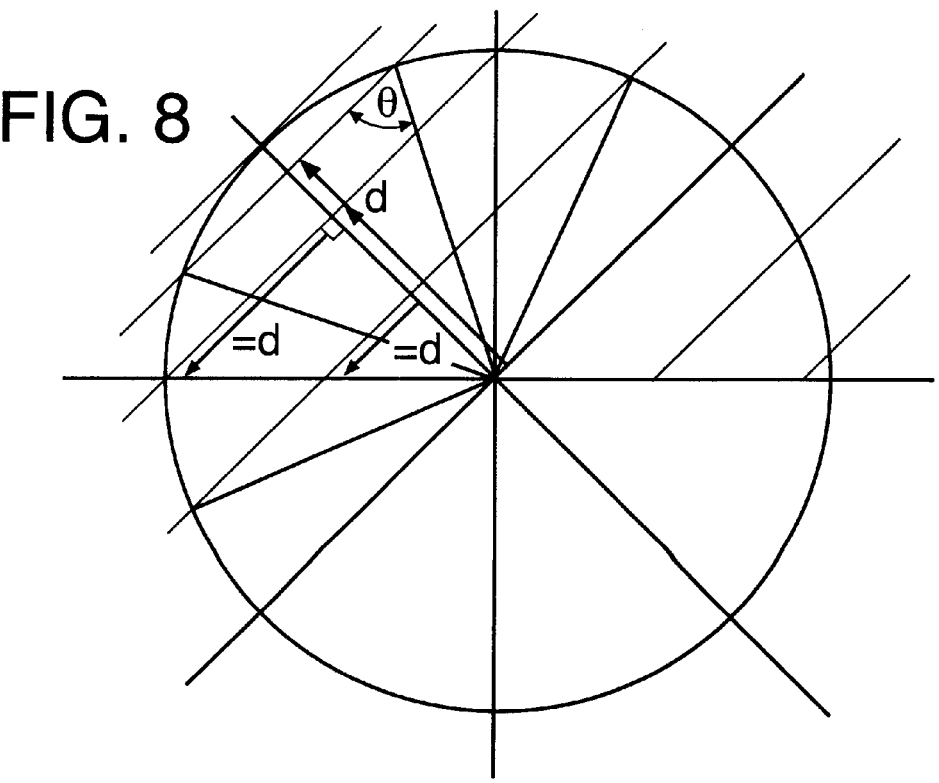
FIG. 8 is a diagram supporting a calculation of area for one of the panel configurations depicted.

A truncated circle 46 within the dome 48, as shown in FIG. 7C, has a larger area than either of the panel configurations shown in FIGS. 7A and 7B. This is shown in FIG. 8 and the following calculations associated with FIG. 8:

parameterize in displacement d $\Theta$ = angle formed by panel and sphere radius (perpendicular to sphere surface at point of panel & sphere contact)

$$0 \leq d \leq \sqrt{\phantom{-}} s \quad d/r_s(\text{sphere}) = \sin\Theta \quad r_c(\text{circle}) = r_s \cos\Theta$$

$$d/r_c = \tan\Theta (= \sin\Theta/\cos\Theta = d/r_s/r_c/r_s = d/r_c) \quad r_c^2 + d^2 = r_s^2$$

$$A_c = \pi r_c^2 = \pi(r_s^2 - d^2)$$

(area un-truncated circle)

All of FIGS. 7A–7C show the solar arrays at 45° to the horizontal, and the calculations are based on this assumption. The illustrated panel configurations are of interest when the solar array is to be contained and is to rotate within a protective transparent dome.

Figure 9:
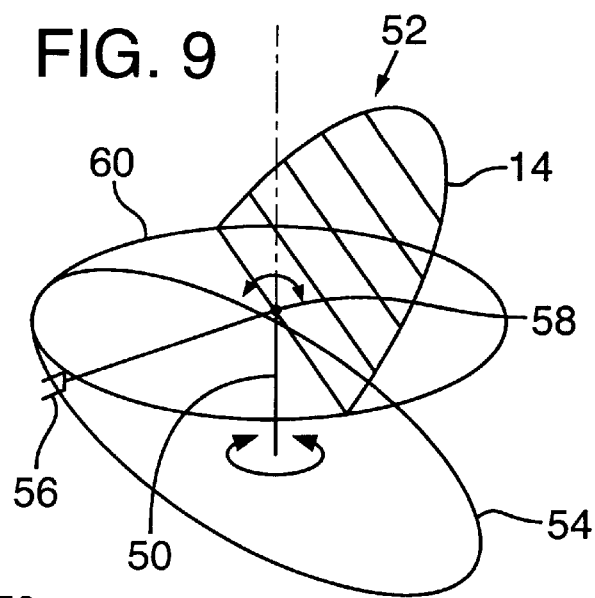
FIG. 9 is a schematic perspective view showing another single axis solar tracker, with a correction guide track.

FIG. 9 depicts a semi-circular PV panel array mount for rotation about a vertical solar tracking axis 50, similar to what is shown in FIG. 1. However, in this embodiment the angle which the solar panel array 52 makes relative to the horizon is not fixed at 45°. Instead, this tilting is now varied throughout the day, to more closely approximate a two axis tracker.

As in the embodiment shown in FIG. 1, the solar panel array 52 rotates about a single vertical axis 50, during daily solar tracking. The individual solar panels are attached to the trellis mount frame 14, which may be similar to that shown in FIG. 1. However, this embodiment differs from FIG. 1 in having a correction mechanism. It is desired that the solar panel array 52 be tilted to more nearly vertical for sunrise and sunset, and closer to horizontal at high noon. The amount of desired tilt correction varies throughout the day, and with time of year (season) and installation latitude.

A polar axis correction guide track or ring 54 is tilted relative to horizontal, and parallels the sun's relative motion. The guide track 54 is adjustable for height, i.e. height relative to the remainder of the apparatus, being raised for summer (to move the panel array 14 closer to horizontal) and lowered for spring and fall, lower still for winter. Its tilt angle is also adjustable to accommodate the installation latitude. This tilt angle is set once, by setting the guide track ring 54 permanently parallel to earth's equator. Thus, the angle which the ring 54 makes relative to local horizontal ground is equal to (90° minus latitude), and this tilt angle is around an east/west axis.

In all cases, the axis 50 of rotation of the array device remains vertical.

In this particular implementation of the principle of this embodiment, a forked follower arm (or an equivalent device) 56 engages the correction guide track 54, imparting tilt correction on the panel mount 14. The fork follower arm 56 is rigidly secured to the trellis frame 14 so that the trellis frame and panel 52 follow the tilt motion of the arm 56. An altitude pivot point 58 allows the panel frame 14 to tilt relative to the horizon and relative to an optional, fixed horizontal guide ring 60.

FIGS. 10–13 show a variation of the embodiment of FIG. 9, based on similar principles. In this embodiment, axes are exchanged as compared to the embodiment of FIG. 9. This form of the invention accomplishes the same goal, of tilting the solar panel to more nearly approximate a dual axis tracker.

Figure 10:
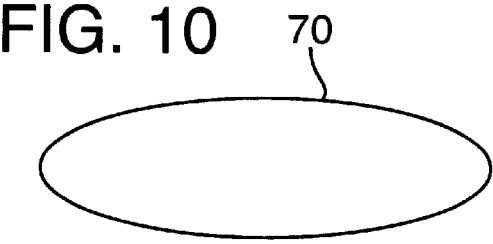
FIG. 10 shows a horizontal circular guide ring for another embodiment of a single axis solar tracker.
Figure 11:
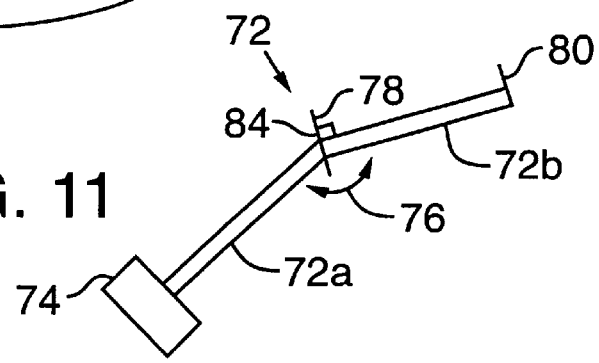
FIGS. 11 and 12 are schematic side elevation and front elevation views indicating components and a subassembly of a solar tracker with horizontal guide.
Figure 12:
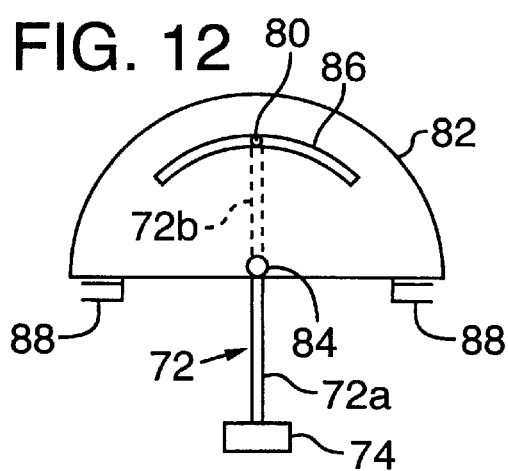
Figure 13:
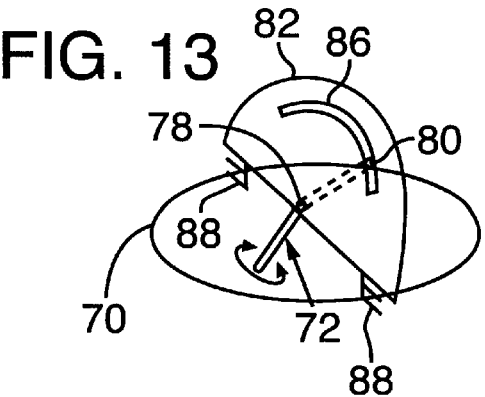
FIG. 13 is a schematic perspective view showing the assembled solar tracker with horizontal guide.

FIGS. 10–12 schematically show components and subassemblies of the solar tracking apparatus, while FIG. 13 schematically illustrates the assembled apparatus.

In FIG. 10, a horizontal guide ring or guide slot 70 maintains the bottom of the solar panel mount parallel to the horizon, and this ring is fixed in position. Its function is similar to that of the tilted correction guide track 54 shown in FIG. 9.

In FIG. 11 a polar axis shaft 72 is mounted with its lower section 72a parallel to earth's axis. A motor 74 turns the polar axis shaft 72a for daily rotation. Seasonal tilt angle, the angle 76 shown in FIG. 11, may be fixed or adjustable. A pivot pin 78 is perpendicular to the upper portion 72b of the polar axis shaft, as is a sliding pin 80.

A solar panel mount 82 is shown in FIG. 12, attached to the polar axis shaft 72. The panel mount 82 has a pivot pin bushing 84, which fits over the pivot pin 78 shown in FIG. 11, and the panel mount also has a sliding pin guide slot 86, which fits over the sliding pin 80 shown in FIG. 11.

In FIG. 13 the solar panel mount 82 and polar axis shaft 72 are shown assembled to the horizontal guide ring 70. Horizontal follower forks 88 (or equivalent structure) secured to a lower edge of the solar panel mount 82 engage the horizontal guide ring 70.

Thus, it is seen that the polar axis shaft 72 imparts true polar tracking to the solar panel mount 82. Meanwhile, the horizontal guide ring 70, followed by the forks 88, causes the bottom edge of the solar panel mount 82 to remain horizontal.

The several embodiments illustrated above show different ways of fitting a solar panel within a hemispherical dome. Variations in panel shape and rotational axes allow more area to fit under the dome, or tilt correction to occur for maximum solar collection efficiency with a single axis tracker.

The above described preferred embodiments are intended to illustrate the principles of the invention, but not to limit its scope. Other embodiments and variations to this preferred embodiment will be apparent to those skilled in the art and may be made without departing from the spirit and scope of the invention.

What is claimed is:

1. A solar tracker driven on a single axis which generally approximates the sun tracking of a dual axis tracker by varying tilt throughout the day, comprising:

a plurality of photovoltaic cells mounted in an array on a frame or mounting plate, first pivot mounting means providing for rotation of the array and frame about a first axis, with the array being generally obliquely tilted relative to the first axis, a housing or base to which said first pivot mounting means is secured, motor means for driving the array in rotation about said first axis such that the array generally faces the direction of the sun and generally tracks the sun through at least a major portion of the day, second pivot mounting means for providing for rotation of the array and frame about a second axis which is generally perpendicular to the first axis and so oriented as to generally vary the tilt angle of the array relative to the first axis and relative to the horizon, when the array is rotated about said second axis, a tilt correction guide track secured to the housing or base, the guide track defining a generally C-shaped path which defines an approximate plane tilted obliquely relative to the first axis, and guide track follower means secured to the frame or mounting plate carrying the array and comprising a projection extending rigidly from the frame or mounting plate, with a guide track follower on the projection positioned to engage with and follow the guide track as the array is rotated about said first axis, so as to vary the tilt of the array by causing rotation of the array on said second pivot mounting means and about said second axis, generally but not completely following the sun's changes in elevation during the day.

2. The solar tracker of claim 1, wherein said first axis is positioned generally vertical.

3. The solar tracker of claim 2, wherein said second axis is positioned generally horizontally.

4. The solar tracker of claim 1, wherein the correction guide track comprises at least a portion of a ring, and wherein the guide track follower comprises a fork at the end of said projection, engaging over the ring.

5. The solar tracker of claim 1, further including a hemispherical transparent dome surrounding the solar tracker.

* * * * *